United States Patent Office 3,395,159
Patented July 30, 1968

3,395,159
VANADIUM OXIDE CATALYZED OXIDATIONS
Irving E. Levine, Stinson Beach, Calif., assignor to Chevron Research Company, a corporation of Delaware
No Drawing. Filed Feb. 25, 1965, Ser. No. 435,324
6 Claims. (Cl. 260—346.4)

ABSTRACT OF THE DISCLOSURE

Fused vanadium oxide supported solely by a metal surface as on the inner surface of a metal reactor whose opposite surface is in heat transfer relationship with a fluid heat transfer medium effectively catalyzes the partial oxidation of lower hydrocarbons. Heat transfer is excellent, and undesirable local catalyst hot spots normally experienced in conventional vanadium oxide fixed bed oxidations are avoided. Metal reactors having fused vanadium oxide catalyst-coated surface area to volume ratios in the range 2 to 18 reciprocal linear units are preferred.

---

This invention relates to improved vanadium oxide catalyzed vapor phase oxidations. More particularly, it relates to partial oxidations of hydrocarbons by oxygen in the vapor phase catalyzed by fused vanadium oxide.

Vapor phase oxidations catalyzed by supported vanadium oxide as in a fixed bed are well known in the art and have been used commercially for many years. Although in practice their use and the results have been satisfactory, there is much room and need for improvement. Yields are substantially short of theoretical potentials. Satisfactory temperature control and isothermal operation have not been achieved. The placement and removal of fixed bed catalysts has always been a burdensome problem. Another difficulty inherent in fixed bed catalyst systems is the work factor incidental to driving vaporized feed through the catalyst bed. Still another is the lack of freedom in mechanical design parameters for fixed bed reactors. In general, commercial fixed bed reactor units must be oriented in the vertical sense to prevent channeling and voids in the catalyst bed.

In accordance with the process of the present invention, vanadium oxide catalyzed oxygen oxidations of vaporized hydrocarbons are substantially improved in their use for the production of hydrocarbon partial oxidation products, provided the reaction is effected in a zone defined by a construction metal surface coated with a fused metal oxide oxidation catalyst having vanadium oxide as the primary catalytic component, having the opposite side of this surface in heat transfer relationship with a fluid heat transfer medium, and in which the ratio of the oxide catalyst-coated surface area to the volume of the reaction zone is in the range 2 to 18 reciprocal linear units. So long as the oxidation is accomplished in the above reactor at temperatures from about 300–650° C., at a pressure less than about 3 atmospheres, and residence times less than about 10 seconds with an oxygen containing gas, improved oxidations result. A further requirement is that the concentration of oxygen in the gas should not exceed about 50 mol percent and that the amount of oxygen relative to the hydrocarbon feed not exceed a mol ratio of about 60 mols of oxygen per mol of hydrocarbon in the reaction zone.

Operation in the above manner has been found to be advantageous over prior art fixed catalyst bed methods in many respects. Isothermal operation is essentially achieved. Thus local hot spotting and piecemeal functioning of the catalyst bed is no longer apparent. Consequently, overoxidation of the feed is materially reduced, and yield improvements of the order of 10–15 mol percent and higher are enjoyed.

Surprisingly, the use of fused vanadium oxide and the coating of the interior wall surfaces therewith makes possible a further advantage. It has been found that fused vanadium oxide effectively wets, covers and persists on metallic surfaces. Therefore ordinary materials of metal construction such as carbon steel, special steel alloys, stainless steels, copper, nickel, titanium and the like, many of which formerly could not be used because of adverse catalytic effects upon the desired products, are now found to be useful.

In general, all that is required to coat the reactor wall surface with fused vanadium oxide is to permit a melt of vanadium oxide to flow over the clean metal surface. From the passing melt phase is deposited on the wall sufficient vanadium oxide to provide an effective surface coating having a long and satisfactory life as an oxidation catalyst. Adverse wall effects formerly experienced are materially if not fully eliminated.

The use of the present invention for oxygen oxidations of hydrocarbons in general is contemplated. These oxidations wherein hydrocarbons are converted to partial oxidation products are all highly exothermic, suffer from lack of efficient temperature control and with resulting overoxidations wherein material sacrifices of feed to undesired by-product are experienced. Thus, any vaporizable hydrocarbon known to be partially oxidized in the presence of oxygen and vanadium oxide is a useful feed in the process.

In particular, hydrocarbon feeds contemplated for the instant process are those lower hydrocarbons having less than about 13 carbon atoms per molecule. Most particularly, the methyl substituted benzenes having no other substitutents, are contemplated.

Representative hydrocarbon feed compounds are o-xylene, naphthalene, toluene, benzene, m-xylene, p-xylene, xylene mixtures, ethylbenzene, α-methyl naphthalene, propene, butene, butane, cyclohexane and the like hydrocarbons.

Representative oxidation products include phthalic anhydride, maleic anhydride, benzoic acid, toluic acid, cyclohexanol, cyclohexanone, benzonitrile, isophthalonitrile, acrylonitrile, acetophenone, terephthalonitrile and the like.

For nitrile production from about 1 to 10 mols of ammonia per mol of hydrocarbon feed is also introduced into the reaction zone.

Vanadium oxide per se is especially useful in the process as are also modified vanadium oxide oxidation catalysts, so long as vanadium oxide is the primary catalyst component. Thus, certain inorganic additives are also useful in minor amounts, i.e., up to about 40 weight percent of the total mixture as known in the art so long as the mixture is fusible. Since impurities generally lower fusion temperatures, added materials are frequently beneficial at least insofar as ease of fusion is concerned. Generally, the additives are oxidation promoter materials such as other heavy metal oxides including the oxides of molybdenum, chromium, tungsten, tin, lead, platinum, silver and the like. Other metal oxide additives often used for the modification of vanadium oxide catalysts and contemplated herein are alkali metal oxides, alkaline pyrosulfates and the like. Vanadium oxide oxidation catalysts are known in the art and are not per se the basis of the present invention. Therefore, an extensive discussion of known art is not believed necessary nor desirable.

Satisfactory fused vanadium oxide coatings may be applied to the interior surfaces of a reaction zone in a number of ways: (1) The heated reactor vessel may be filled with fused vanadium pentoxide and the excess melt drained; (2) metal reactor tubes partially filled with fused vanadium oxide may be rotated in the horizontal plane while being heated in a furnace or by electrical resistance heating; (3) vanadium metal may be electroplated on the reactor surface followed by heating of the plated surface in an oxygen atmosphere and further followed by heating to fusion temperatures for a period sufficient to insure oxide fusion; (4) and the like. Satisfactory fused oxide coatings are of the order of 0.01 to 1.0 mm. thick. Thicker coatings are also satisfactory but inefficient. Very thick coatings are undesirable because of poor heat transfer characteristics.

The following examples are illustrative of various aspects of the subject invention. Variations can be made, of course, and should be understood to be within the scope of the invention in view of the above disclosure and succeeding comments and claims.

The production of partial oxidation products by vapor phase catalytic oxygen oxidations per se is, of course, known in the art and is not a part of the present invention. The instant process as described above is an improvement in this art.

Example 1

A reactor tube fabricated out of 304 stainless steel having the following dimensions:

Outside diameter, cm. _____ 1.9
Wall thickness, mm. _____ 2.1
Length, cm. _____ 81.3 was heated in a muffle furnace to about the fusion temperature of vanadium pentoxide, i.e., approximately 690° C. A portion of vanadium pentoxide was also heated in the range 690–700° C. and poured into the above tube after which it was drained under gravity flow. A layer of fused vanadium oxide 0.03±0.01 mm. thick was deposited uniformly on the tube walls.

A bottom and top header were then secured to the ends of the reactor tube to facilitate introduction of air and vaporized feed and removal of product.

A molten salt bath was placed in direct heat exchange relationship with the exterior walls of the oxide coated tube, and both bath and tube were maintained at 510° C. during the production of phthalic anhydride from o-xylene under the following conditions:

Weight ratio, air:o-xylene _____ 20
Contract ratio, mg. o-xylene/cm.$^2$ oxide/min. ____ 0.3
Residence time, sec. _____ 1.7
Catalyst preconditioning, hrs. _____ 3.0
Conversion, percent _____ 98
Yield, wt. percent [1] phthalic anhydride_____ 106

[1] All determinations made by vapor phase chromatographic techniques.

Example 2

A multitube reactor, each tube of which had essentially the asme dimensions as in Example 1 above, was charged with vanadium oxide supported on Carborundum, heated by a surrounding salt bath maintained at 500–510° C. o-Xylene was introduced into the reactor and oxidized under substantially comparable conditions and conversion. At a point about 20 cm. down the reactor tube the usual local hot spot temperature of about 625° C. was present. The yield of phthalic anhydried was only 90 weight percent.

Example 3

In a series of experiments a variety of uncoated reactor tubes were tested for wall effects by securing headers to them as in Example 1 and maintaining temperature also as in Example 1. Under the following noted conditions the corresponding results were found:

MATERIALS OF CONSTRUCTION AND YIELD OF PRODUCT

| Reactor, .95 cm. Dia. | Thermo Well, .48 cm. Dia. | Flow Rate,[1] Ml./Min. | Temp., ° C. | o-Xylene,[2] percent conversion |
|---|---|---|---|---|
| Glass | Glass | 90 | 593 | 1 |
| 304 SS | do | 90 | 593 | 5 |
| 304 SS | 304 SS | 90 | 593 | 12 |
| 304 SS | 316 SS | 90 | 593 | 17 |
| 316 SS | 316 SS | 90 | 593 | 41 |
| 316 SS | 316 SS | 90 | 538 | 23 |
| Carbon Steel | Carbon Steel | 90 | 593 | [3] 100 |
| Do | do | 360 | 538 | 68 |

[1] Air: o-xylene weight ratio=20.
[2] Products mainly $CO_2$, CO plus traces of o-tolualdehyde.
[3] $CO_2$ sole product.

Example 4

A carbon steel tube of the kind used in Example 3, having a length of 25.4 cm., an O.D. of .63 cm. and a wall thickness of 0.9 mm., was coated with fused vanadium oxide as in Example 1. At 426° C. an air:o-xylene mixture, 20:1 ratio, and at a 2.2 sec. contact time, was passed through the fused oxide coated tube. The o-xylene conversion to product was complete. The weight percent yield of phthalic anhydride was 107.

Example 5

A catalyst activity and life test was made by coating a reactor tube with fused vanadium oxide as in Example 1. The length of the tube was 4.1 cm., and the outside diameter was .48 cm. The reaction conditions were as follows:

Temperature, ° C. _____ 510
Bath medium _____ Molten tin
Residue time, milliseconds _____ 172
o-Xylene/air wt. ratio _____ 20/1
Time, hrs. _____ 120

Except for minor fluctuations, starting from zero time on up to 60 hours, no substantial change was seen in the yield of phthalic anhydride. After 120 hours the yield had dropped about 3 mol percent. However, the o-xylene feed was stopped, but the flow of air continued a short time and then the o-xylene feed again started. The short regeneration period had returned the catalyst to its original activity and ability to produce the desired excellent phthalic anhydride yield.

Example 6

Similar to Example 1 a 304 stainless steel tube having the following dimensions:

Outside diameter, cm. _____ .64
Wall thickness, mm. _____ .9
Length, cm. _____ 25.4 was filled with fused vanadium oxide catalyst which was a mixture of 99 parts vanadium pentoxide and 1 part platinum oxide. The fusion temperature was about 760° C. The excess catalyst was drained from the tube.

A mixture of air:ammonia:m-xylene in the weight ratio 22:1.7–1.9:1, respectively, was passed through the coated tube under the conditions and with the results noted as follows:

| Run No. | Contact Time (Sec.) | Temp., ° C. | Percent Conversion | Mole percent Yield on m-xylene | | |
|---|---|---|---|---|---|---|
| | | | | IPN | m-TN | $CO_2$+CO |
| 1 | 1 | 454 | 98 | 54 | 36 | 10 |
| 2 | 1 | 510 | 100 | 62 | 18 | 20 |
| 3 | 2 | 454 | 100 | 70 | 18 | 12 |
| 4 | 2 | 426 | 95 | 46 | 42 | 12 |

IPN=Isophthalonitrile; m-TN=m-Tolunitrile.

The above data was obtained using vapor phase chromatographic techniques.

When the same catalyst is used except that a conventional supporting material such as silicon carbide is used in a fixed catalyst bed at 479° C., under essentially optimum conditions at 95% conversion, there results a 65 mol percent yield of isophthalonitrile, and little or no m-tolunitrile is produced.

The advantage of the present process is clearly apparent; thus in Run No. 3 above, the yield of IPN was superior, and the combined yield of useful product was 88 mol percent.

Example 7

In another oxidation, o-xylene was converted to phthalic anhydride using air and a modified fused vanadium oxide catalyst. Thus a fusion of the following components (parts by weight) was prepared and coated on a reactor tube as in Examples 6 and 1 above:

| | |
|---|---|
| Vanadium pentoxide | 69.5 |
| Molybdenum oxide | 21.4 |
| Vanadium dioxide | .94 |
| Silver nitrate | 2.39 |
| Silver phosphate | 5.87 |

The yield of phthalic anhydride was 73 mol percent, based on o-xylene.

Example 8

In another oxidation using the same catalyst as in Example 7 but with a benzene-air feed, 1:27, respectively, at 593° C., there resulted a 55% conversion of the benzene and a 62 mol percent yield of maleic anhydride.

While conventional tubes have been used in the foregoing examples, any geometrical reactor arrangement is useful in the subject process so long as it has a surface area volume relationship in the useful range as noted above.

The foregoing examples demonstrate that material advantages are enjoyed by the present oxidations as compared to conventional vapor phase vanadium oxide catalyzed partial oxidations of hydrocarbons. Obviously, since there are several degrees of useful partial oxidation, and further since a lesser oxidized material of an oxidation set is generally an intermediate as between starting hydrocarbon and final useful product, partially oxidized hydrocarbons are also useful process feed compounds. Thus, benzyl alcohol or toluene could be used as feeds for a benzoic acid process, for example.

Having described the above invention by examples and description thereof, it is to be understood that no undue restrictions or limitations are to be drawn by reason of the specific examples and that it is to be further understood that many variations and modifications are within the scope of the instant invention.

I claim:

1. In the vapor phase oxidation of a hydrocarbon selected from the group consisting of hydrocarbons having less than 13 carbon atoms by reacting said hydrocarbon with oxygen in a reaction zone in an oxidation catalyzed by vanadium oxide at a temperature in the range from about 300–650° C. and at a pressure less than about 3 atmospheres, wherein for each mol of said hydrocarbon introduced into said zone from about 0.1 to 60 mols of oxygen are introduced, said oxygen being mixed with at least one inert gas selected from the group consisting of nitrogen, carbon dioxide and water vapor and wherein the concentration of oxygen said mixture is less than about 50 mol percent, thereby producing the corresponding partially oxidized hydrocarbon, the improvement which comprises carrying out said reaction in a reactor selected from the group consisting of metal reactors wherein the inner and reaction-side surface of said reactor is coated with said vanadium oxide catalyst, wherein the side opposite said vanadium oxide-coated surface is maintained in heat transfer relationship with a fluid heat transfer medium, and wherein the ratio of said vanadium oxide catalyst-coated surface area to the volume of said reaction zone is in the range from about 2 to 18 reciprocal linear units, said inner reactor metal surface being the sole support for said vanadium oxide catalyst and said vanadium oxide having been applied to said surface as a fused vanadium oxide melt.

2. The process of claim 1 wherein from about 1 to 10 mols of ammonia per mol of said hydrocarbon is also introduced into said reaction zone.

3. The process of claim 1 wherein said hydrocarbon is selected from the group consisting of methyl substituted benzenes having no other substituents.

4. The process of claim 3 wherein from about 1 to 10 mols of ammonia per mol of said hydrocarbon is also introduced into said reaction zone.

5. In the vapor phase oxidation of a feed selected from the group consisting of partially oxidized hydrocarbons having less than 13 carbon atoms by reacting said feed with oxygen in a reaction zone in an oxidation catalyzed by vanadium oxide at a temperature in the range from about 300–650° C. and at a pressure less than about 3 atmospheres, wherein for each mol of said feed introduced into said zone from about 0.1 to 60 mols of oxygen are introduced, said oxygen being mixed with at least one inert gas selected from the group consisting of nitrogen, carbon dioxide and water vapor and wherein the concentration of oxygen in said mixture is less than about 50 mol percent, thereby producing the corresponding partially oxidized hydrocarbon having an increased degree of oxidation, the improvement which comprises carrying out said reaction in a reactor selected from the group consisting of metal reactors wherein the inner and reaction side surface of said reactor is coated with said vanadium oxide catalyst, wherein the side opposite said vanadium coated surface is maintained in heat transfer relationship with a fluid heat transfer medium, and wherein the ratio of said vanadium oxide catalyst coated surface area to the volume of said reaction zone is in the range from about 2 to 18 reciprocal linear units, said inner reactor metal surface being the sole support for said vanadium oxide catalyst and said vanadium oxide having been applied to said surface as a fused vanadium oxide melt.

6. In the production of phthalic anhydride by reacting o-xylene with air in an oxidation catalyzed by vanadium oxide in a reaction zone at a temperature of about 426–510° C. and at a pressure less than about 3 atmospheres wherein said air and o-xylene are introduced into said reaction zone at a weight ratio of about 20 to 1, respectively, and wherein the residence time of said reactants in said zone is about 1.7–2.2 seconds, the improvement which comprises carrying out said reaction in a steel reactor wherein the inner and reaction side surface of said reactor is coated with said vanadium oxide catalyst, wherein the side opposite said vanadium oxide coated surface is maintained in heat transfer relationship with a fluid heat transfer medium, wherein said inner reactor metal surface is the sole support for said vanadium oxide catalyst and wherein said vanadium oxide is applied to said inner surface as a fused vanadium oxide melt.

References Cited

UNITED STATES PATENTS

| | | | |
|---|---|---|---|
| 1,872,956 | 8/1932 | Jaeger et al. | 260—346.4 |
| 2,499,055 | 2/1950 | Cosby et al. | 260—465 |
| 3,177,229 | 4/1965 | Leak et al. | 260—436.4 |

OTHER REFERENCES

Emmett, P.H.: Catalysis, volume VII, N.Y., Reinhold, 1960, p. 208–9.

NICHOLAS S. RIZZO, *Primary Examiner.*

B. DENTZ, *Assistant Examiner.*